(12) United States Patent
Numano (10) Patent No.: US 8,150,539 B2
(45) Date of Patent: *Apr. 3, 2012

(54) INFORMATION PROCESSING APPARATUS AND METHOD FOR CONTROLLING POWER SUPPLY OF THE APPARATUS

(75) Inventor: Fujihito Numano, Bunkyo-Ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 703 days.

This patent is subject to a terminal disclaimer.

(21) Appl. No.: 12/192,770

(22) Filed: Aug. 15, 2008

(65) Prior Publication Data

US 2008/0313477 A1     Dec. 18, 2008

Related U.S. Application Data

(63) Continuation of application No. 11/200,102, filed on Aug. 10, 2005, now Pat. No. 7,489,974.

(30) Foreign Application Priority Data

Aug. 11, 2004   (JP) ................................ 2004-234730

(51) Int. Cl.
*H02J 7/00* (2006.01)
*H02J 7/16* (2006.01)
*H01R 13/502* (2006.01)
*H01R 29/00* (2006.01)

(52) U.S. Cl. .......... 700/22; 713/321; 320/106; 320/125; 320/150; 439/668; 439/188

(58) Field of Classification Search .................. 713/321; 700/22

See application file for complete search history.

(56) References Cited

U.S. PATENT DOCUMENTS

| 6,178,513 | B1 | 1/2001 | Lee |
| 6,345,364 | B1 * | 2/2002 | Lee ................................ 713/324 |
| 6,774,604 | B2 * | 8/2004 | Matsuda et al. .............. 320/110 |
| 6,782,491 | B1 | 8/2004 | Foedlmeier et al. |
| 6,882,174 | B2 | 4/2005 | Niwa |
| 6,946,817 | B2 | 9/2005 | Fischer et al. |
| 7,024,567 | B2 | 4/2006 | Kim et al. |
| 2002/0162036 | A1 * | 10/2002 | Kim et al. ..................... 713/300 |

FOREIGN PATENT DOCUMENTS

| JP | 2000-201204 | 7/2000 |
| JP | 2000-339067 | 12/2000 |
| JP | 2001-117676 | 4/2001 |
| JP | 2001-306193 | 11/2001 |
| JP | 2003-195987 | 7/2003 |
| JP | 2004-152317 | 5/2004 |
| JP | 2004-521419 | 7/2004 |

* cited by examiner

*Primary Examiner* — Albert Decady
*Assistant Examiner* — Sunray Chang
(74) *Attorney, Agent, or Firm* — Oblon, Spivak, McClelland, Maier & Neustadt, L.L.P.

(57) ABSTRACT

An information processing apparatus includes an information processing unit, an interface supplying electrical power to and communicating a signal with an external electronic device through a single connector, a unit supplying electrical power to the electronic device through the interface and including a rechargeable battery. Detection units detect a connection of the electronic device to the apparatus, an external power supply. The power supply control, when the connections are detected, keeps supplying electrical power to the electronic device through the interface even after deactivation of the apparatus, in the event an instruction to turn off a power supply of the apparatus or deactivate the apparatus is issued. When the connection of the external power supply for charging the rechargeable battery to the apparatus is not detected, the power supply does not supply electrical power to the electronic device even during operation of the apparatus.

13 Claims, 7 Drawing Sheets

INFORMATION PROCESSING APPARATUS AND METHOD FOR CONTROLLING POWER SUPPLY OF THE APPARATUS

CROSS-REFERENCE TO RELATED APPLICATIONS

This application is a continuation of U.S. patent application Ser. No. 11/200,102, filed Aug. 10, 2005 now U.S. Pat. No. 7,489,974, and based upon and claims the benefit of priority from the prior Japanese Patent Application No. 2004-234730, filed Aug. 11, 2004, the entire contents of which are incorporated herein by reference.

BACKGROUND OF THE INVENTION

1. Field of the Invention

The present invention relates to an information processing apparatus and a method for controlling a power supply of the apparatus, and more particularly to an information processing apparatus for supplying power to external devices and a method for controlling a power supply of the apparatus.

2. Description of the Related Art

Nowadays, a cellular phone has been widely used in Japan as well as in all other countries around the world. The cellular phone has now digital camera function, Internet access function and various information processing functions in addition to conventional phone function and email function, thereby significantly increasing its convenience. Accordingly, it could be predicted that the cellular phone would continue to be widely used in the future.

Further, portable electronic devices such as digital camera, PDA (Personal Digital Assistance), portable audio player, etc., have been also widely used similarly to the cellular phone.

Many of these portable electronic devices incorporate a rechargeable battery such as Lithium-ion battery and are powered by the rechargeable battery. Further, when the rechargeable battery loses its power, the battery is in many cases charged with electrical power from the commercial power supply via an AC adapter, etc., dedicated to the individual portable electronic devices.

Further, an information processing apparatus typified by a personal computer has also been widely used similarly to the portable electronic devices. The information processing apparatus has various interfaces for connection with various external devices and among these interfaces, an interface configured in accordance with an industry standard such as the USB (Trademark) (Universal Serial Bus) specification or the IEEE 1394 specification is provided in many information processing apparatuses.

Moreover, in response to the fact that an interface designed in accordance with the USB specification or the IEEE 1394 specification tends to be commonly used in an information processing apparatus, many of portable electronic devices including a cellular phone tend to be provided with an interface designed in accordance with the USB specification or the IEEE 1394 specification.

USB is positioned as an interface technology to be applied to a pair of lines that can carry out serial digital data transfer through a bi-directional serial line as well as power and ground lines through which power is supplied to external devices.

Similarly to USB, IEEE 1394 is also positioned as an interface technology to be applied to a pair of lines that can carry out serial digital data transfer and is a specification that describes a method for supplying power to external devices.

Note that power supplied via an interface that supports the interface specification such as USB and IEEE 1394 is in some cases referred to as bus electrical power.

If bus electrical power can be supplied from a personal computer, etc., through USB cables to charge the battery of a portable electronic device such as a cellular phone, a user of portable electronic device is able to enjoy great convenience because he/she has no need to bring with himself/herself an AC adapter, etc., dedicated to individual portable electronic devices.

Some references disclose a technique for charging the battery of a portable electronic device such as a cellular phone using bus electrical power through USB cables.

For example, Japanese Unexamined Patent Publication (Kokai) No. 2000-201204 discloses a cable having one end connected to a USB connector of an information processing apparatus such as a personal computer and the other end connected to a battery charge connector on a cellular phone. More specifically, the cable is for supplying bus electrical power from a USB connector provided in the information processing apparatus to the cellular phone, thereby charging the cellular phone battery.

In addition to the configuration of the battery charge cable disclosed above, Japanese Unexamined Patent Publication (Kokai) No. 2000-339067 has a feature that a voltage conversion function and an over-current protection function are provided in the middle of the cable.

Further, Japanese Unexamined Patent Publication (Kokai) No. 2004-152317 discloses a technique for efficiently utilizing capabilities enabled by the OTG (USB On-The-Go) specification, which is a supplement to the USB specification (USB specification version 2.0), to allow a user to further enjoy the convenience of charging a battery using bus electrical power through USB cables.

In more detail, the battery charge method disclosed in above Kokai No. 2000-201204 or No. 2000-339067 is to supply power in one direction only, i.e., in a direction from a host device (personal computer, etc.) to a terminal device (external device such as a cellular phone connected to a personal computer, etc.). In other words, this method provides a "one-way" battery charge function.

In contrast to the above methods, Kokai No. 2004-152317 discloses a technique for connecting two terminal devices (e.g., devices A and B) using a USB OTG cable and allowing a battery provided in the device A or an external power supply connected to the device A to charge the battery of the device B. Further, the technique includes, for example, simply changing the USB cable connection in order to allow a battery provided in the device B or an external power supply connected to the device B to charge the battery of the device A. In this manner, the technique enables one of the two devices to charge the battery of the other, thereby providing a "two-way" battery charge function.

According to the battery charge techniques disclosed in above references, it becomes possible to retrieve bus electrical power from a USB connector provided in many of nowadays information processing apparatuses and terminal devices and use the bus electrical power to charge the battery of a portable electronic device such as a cellular phone. This eliminates the need for a user to bring out an electronic device such as an AC adaptor, which is dedicated to the battery charge working, for use at his/her destination site, thereby allowing the user of a portable electronic device to enjoy great convenience.

Note that interface specifications for USB, etc., (hereinafter, an interface designed in accordance with the USB specification or the IEEE 1394 specification to be able to supply bus electrical power are referred to as a USB interface, etc.) are originally intended to unify interfaces for data communication between an information processing apparatus such as a personal computer and an external device to be connected to the apparatus. Accordingly, in general, unless an information processing apparatus itself has been activated, bus electrical power is never supplied from a USB connector, etc., provided in the information processing apparatus to the external device.

A USB interface, etc., supports the "Hot Plug" function and it is assured that a USB connector, etc., is able to operate even if the USB connector is connected via the USB interface to the information processing apparatus in operation. Accordingly, as long as the information processing apparatus is in operation, it is possible to supply bus electrical power to an external device and communicate data with the external device. However, once the information processing apparatus is turned off, bus electrical power supply to the external device is stopped.

For this reason, when a user tries to connect a portable electronic device such as a cellular phone to the information processing apparatus to charge the battery of the electronic device, the user has to keep the information processing apparatus turned on even if he/she is not using the information processing apparatus. Such an operation is not recommended for the reduction of power consumption.

Further, keeping the information processing apparatus turned on during operation of a cellular phone, etc., is not recommended for the security of the information processing apparatus and in some cases, requires that the user sits near the information processing apparatus until the battery of the phone is fully charged, making the user feel inconvenient.

Further, many of nowadays information processing apparatuses, in particular portable information processing apparatuses such as a note personal computer are equipped with a power saving function. The power saving function is to automatically turn off power supplies excluding power supplies needed for a part of electronic components of the information processing apparatus, for example, when a user does not operate a key board, etc., for a predetermined period of time.

A power saving function called a "suspend" function is, for example, to automatically turn off all of power supplies excluding a power supply needed for a main memory comprised of DRAM, etc., when a user does not operate a key board, etc., for a predetermined period of time and immediately switch back to a mode just prior to the beginning of a suspend mode based on information stored in the main memory when the user presses any key on the keyboard.

Further, a power saving function called a "hibernation" function is to store in an HDD (Hard Disk Drive) the information contained in a main memory and turn off almost all of power supplies needed for electronic components including the main memory for the purpose of saving power.

The "suspend" and "hibernation" functions, etc., are very useful in terms of saving power on the information processing apparatus, however, when a cellular phone, etc., is connected to the information processing apparatus for charging the battery of the phone, power supplies in the information processing apparatus are turned off upon automatic activation of a power saving function before the battery is fully charged, inconveniently interrupting the battery charge process at this point.

Further, it is also possible to disable the "suspend" function or "hibernation" function to preferentially charge the battery of the external device. However, in such a case, after completion of battery charge, a user has to enable again those power saving functions in a time-consuming manner.

SUMMARY OF THE INVENTION

The present invention has been conceived in consideration of the above-mentioned problems and an object of the invention is to provide an information processing apparatus capable of charging a battery or supplying power to a battery of a portable electronic device, such as a cellular phone, connected to the information processing apparatus, using bus electrical power through USB cables, etc., even in a case where power supplies in the information processing apparatus are turned off or in a case where a power saving function in the information processing apparatus is being enabled and further to provide a method for controlling a power supply of the apparatus.

In a first aspect of the present invention, an information processing apparatus includes: an information processing unit configured to process various information; an interface capable of supplying electrical power to and communicating a signal with an electronic device external to the apparatus through a single connector; a power supply unit capable of supplying electrical power to the electronic device through the interface; an electronic device detection unit configured to detect connection of the electronic device to the apparatus; an external power supply detection unit configured to detect an external power supply to the apparatus, the external power supply operable to supply electrical power to the power supply unit; and a power supply control unit, when the connection of the electronic device and the external power supply to the apparatus are detected by the electronic device detection unit and the external power supply detection unit respectively, configured to keep supplying electrical power to the electronic device through the interface even after deactivation of the apparatus, in the event an instruction to turn off a power supply of the apparatus or deactivate the apparatus is issued.

In a second aspect of the present invention, a method for controlling a power supply of an information processing apparatus that includes an interface capable of supplying electrical power to and communicating a signal with an electronic device external to the apparatus through a single connector and a power supply unit capable of receiving electrical power from an external power supply, the method includes: supplying electrical power to the electronic device from the power supply unit through the interface during operation of the information processing apparatus; and keeping supplying electrical power to the electronic device through the interface even after deactivation of the information processing apparatus, in the event the electronic device and the external power supply are being connected to the information processing apparatus.

In a third aspect of the present invention, a method for controlling of an information processing apparatus that includes an interface capable of supplying electrical power to and communicating a signal with an electronic device external to the apparatus through a single connector and a power supply unit having a rechargeable battery and being capable of receiving electrical power from an external power supply, the method includes: a first step of supplying electrical power to the electronic device from the power supply unit through the interface when the electronic device is being connected to the connector during operation of the information processing apparatus; a second step of detecting the state of the power supply unit when operation of the information processing apparatus is terminated or interrupted; and a third step of, in accordance with the detected state in the second step, keeping supplying electrical power to the electronic device through the interface even after deactivation of the information processing apparatus.

According to the information processing apparatus and the method for controlling a power supply of the apparatus, even after the power supply of the information processing apparatus is turned off or even when a power saving function of the information processing apparatus is in operation, a portable electronic device, such as a cellular phone, coupled to the information processing apparatus can be electrically charged or supplied with electrical charge in such a manner that bus electrical power is supplied via a USB cable, etc., to the device.

DETAILED DESCRIPTION OF THE PREFERRED EMBODIMENTS

Embodiments of an information processing apparatus according to the invention and a method for controlling a power supply of the apparatus will be explained with reference to the accompanying drawings.

(1) Outline and Principle Operation of an Information Processing Apparatus 1

Figure 1:
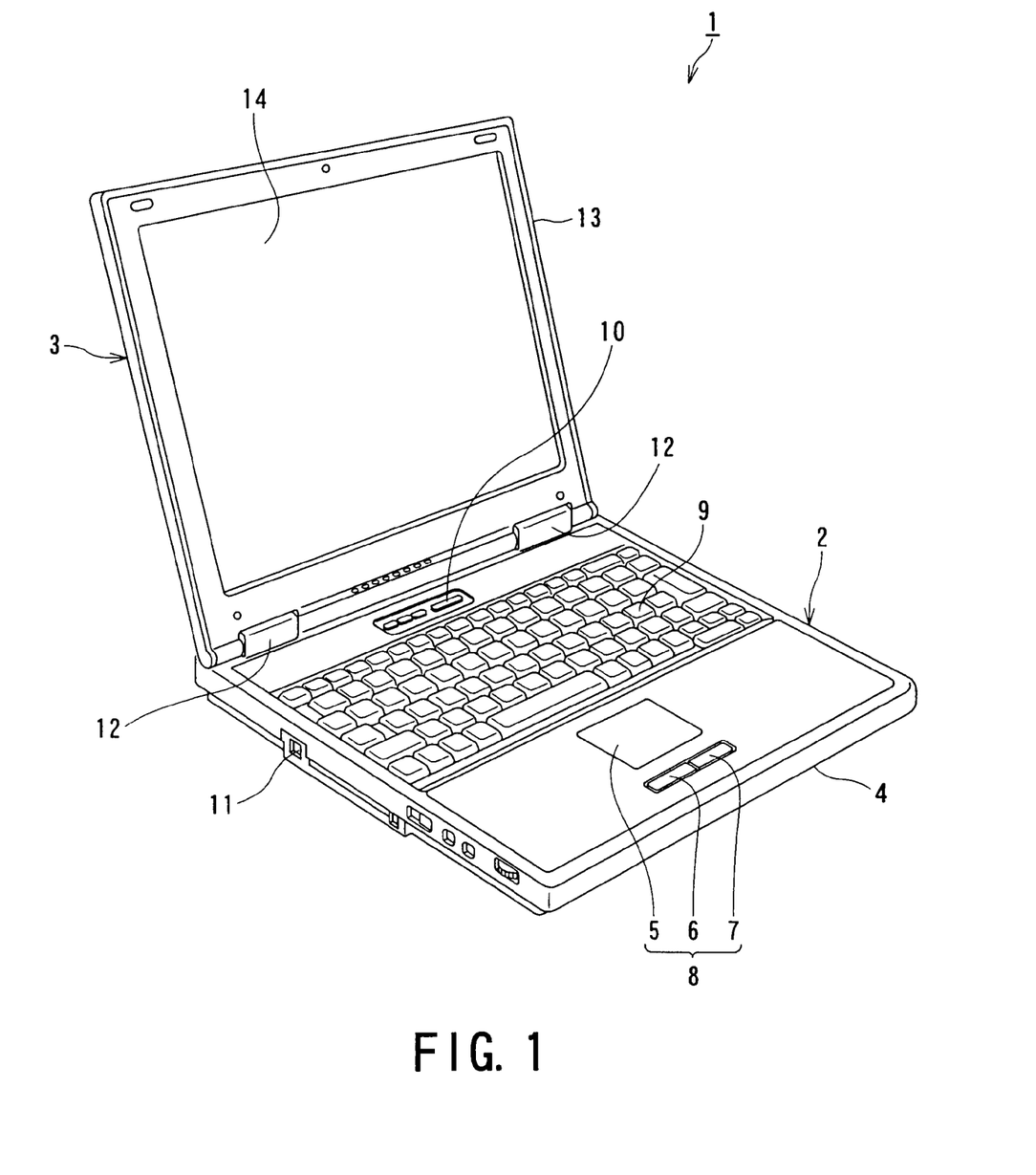
FIG. 1 is the first perspective view showing the appearance of one embodiment of an information processing apparatus according to the invention.

FIG. 1 is a perspective view showing the appearance of one embodiment of the information processing apparatus 1 according to the invention.

The information processing apparatus 1 includes an information processing apparatus main body 2 and a cover member 3.

The information processing apparatus main body 2 includes a thin box-shaped main body casing 4 that accommodates electronic components, such as later described CPU 30, main memory 40 and the like, necessary for information processing.

On the upper surface of the main body casing 4 is provided a keyboard 9 for a user to input various information. Further, on a portion of the casing 4 closer to the user than the keyboard 9 are provided a touch pad 5 for moving a pointer displayed on a display 14 integrated into the cover member 3, and a pointing device 8 comprised of a left-hand button 6 used to click on or drag the pointer and a right-hand button 7.

On a portion of the casing 4 farther from the user than the keyboard 9 is provided a power supply switch 10 for activating the information processing apparatus 1.

The cover member 3 is capable of protecting the information processing apparatus main body 2 when the user is not using the information processing apparatus 1 or is carrying the same and further is capable of displaying various information, and a cover main body 13 of the cover member is attached to the main body casing 4 via two hinges 12 so as to freely open and close.

A square opening is provided within the cover main body 13 and the display 14 such as a liquid crystal display is disposed in the cover main body so that the display is exposed through the opening.

On the main body casing 4 of the information processing apparatus main body 2 are provided with various connectors for interfacing with external electronic devices. For example, an IEEE 1394 compliant connector 11 that is designed in accordance with the IEEE 1394 specification is provided on the left side face of the main body casing 4 in FIG. 1.

Figure 2:
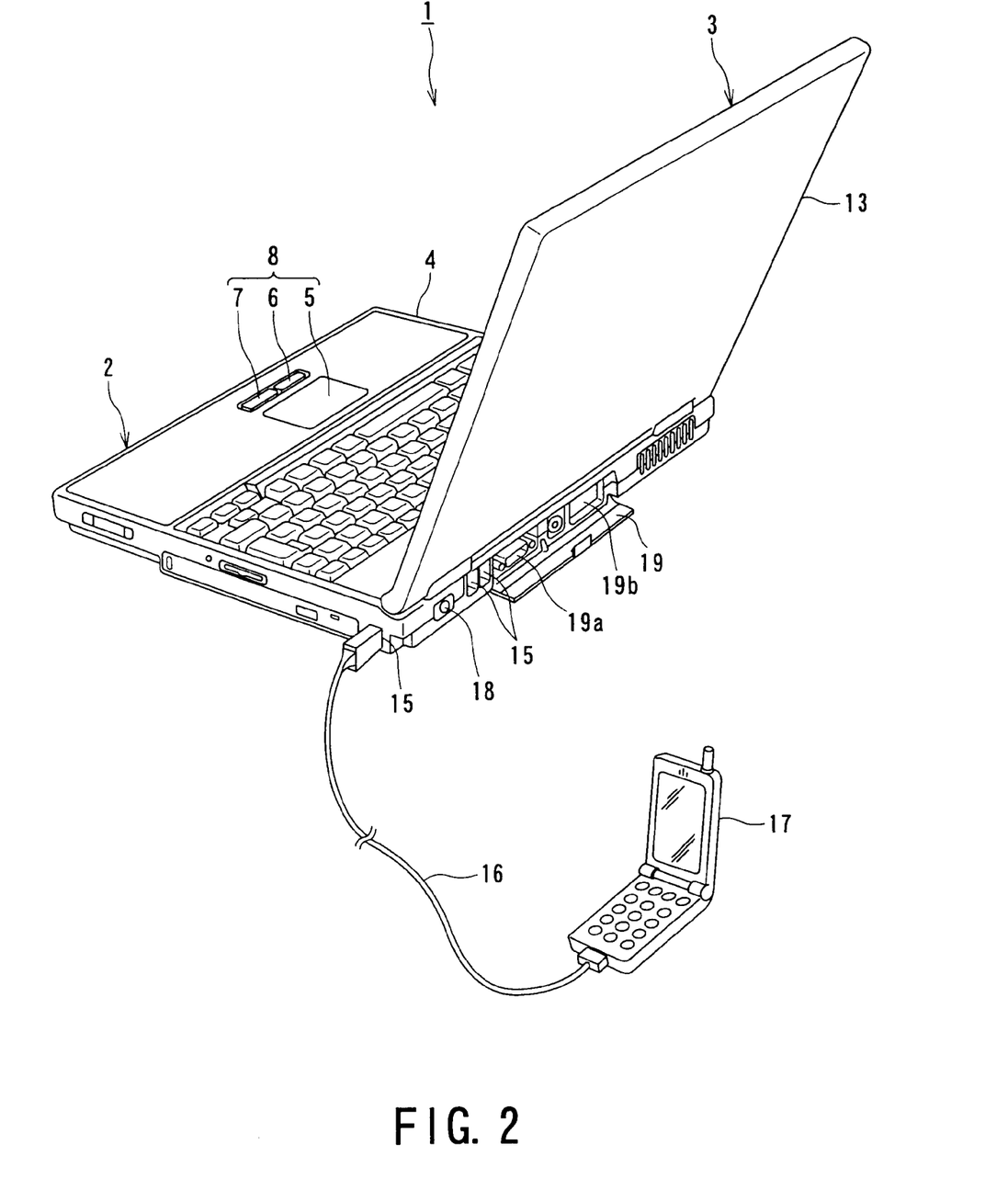
FIG. 2 is the second perspective view showing the appearance of one embodiment of an information processing apparatus according to the invention.

FIG. 2 is a perspective view of the information processing apparatus 1 from the backside. Also, on the back and left side faces of the main body casing 4 of the information processing apparatus 1 in FIG. 2 are provided various connectors.

The information processing apparatus 1 is provided with two USB connectors 15 compliant with USB Specification on the back side face and one USB connector 15 on the left side face in FIG. 2. Further, FIG. 2 illustrates a cellular phone shown as an example of an electronic device 17 external to the apparatus and connected to the apparatus via a USB cable 16.

On the back side face of the main body casing 4 is also provided a power supply connector 18. An AC adaptor (not shown) is connected to the power supply connector 18 and power is supplied to the information processing apparatus 1 from an external commercial power supply via the AC adaptor.

Further, on the back side face of the main body casing 4 is provided a connector door 19. Inside the connector door 19 are provided a RGB connector 19a used to display images, for example, on an external CRT and a LAN (Local Area Network) connector 19b for interfacing with an electrical communication line such as the Internet.

Note that the information processing apparatus 1 according to the invention is not limited to the structure having appearance, shape, size, etc., shown in FIGS. 1 and 2. For example, the information processing apparatus 1 shown in FIGS. 1 and 2 has the appearance of a so-called note personal computer, however, it may be a stationary-type disk-top personal computer. Further, the information processing apparatus 1 may be configured to have the display 14 and the information processing apparatus main body 2 disposed separately from each other. Additionally, the information processing apparatus 1 could be, for example, a server, etc., without the display 14.

Figure 3:
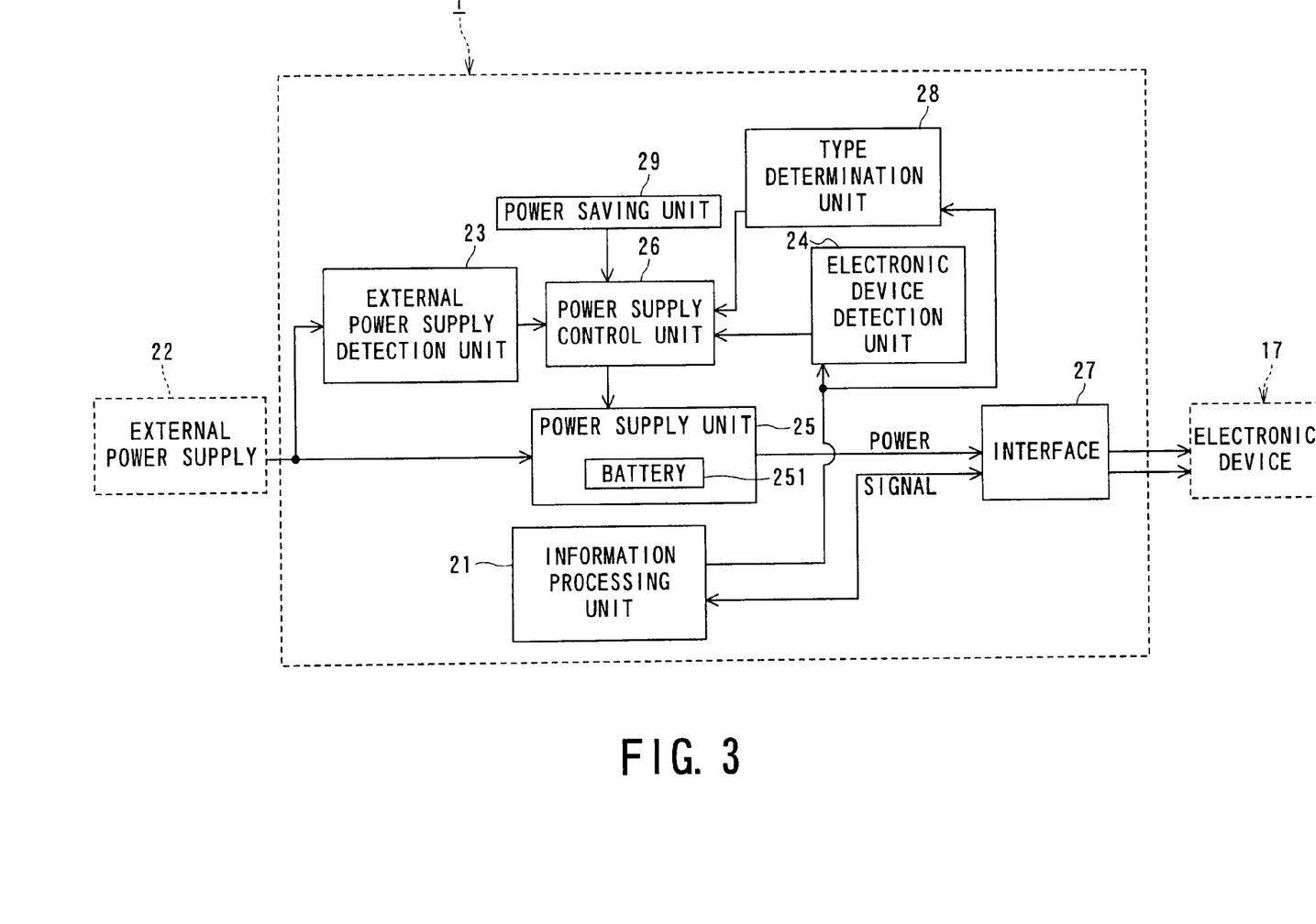
FIG. 3 is a function block diagram of one embodiment of an information processing apparatus according to the invention.

FIG. 3 is a function block diagram illustrating main functions available in the information processing apparatus 1.

The information processing apparatus 1 includes information processing unit 21 for processing of various information as well as external power supply detection unit 23 for detecting connection of an external power supply 22 and electronic device detection unit 24 for detecting connection of an external electronic device 17 such as a cellular phone.

Further, the information processing apparatus 1 includes: a power supply unit 25 for converting voltages supplied from the external power supply 22 to voltages adjusted to individual electronic components included in the information processing apparatus 1 and delivering/supplying the adjusted voltages to the individual electronic components; and power supply control unit 26 for performing various control on the power supply unit 25.

Moreover, the information processing apparatus 1 includes an interface 27 for communication of various signals between the information processing unit 21 and the external electronic device 17 and supplying power called bus electrical power to the external electronic device 17.

The interface 27 includes a USB compliant connector, etc., as well as a USB controller, etc. The USB controller, etc., is for converting parallel data to serial data to produce a USB bus signal, etc., and controlling bus electrical power.

Additionally, the information processing apparatus 1 may be configured to include type determination unit 28 for determining the type of the external electronic device 17 based on a signal received through the interface 27 and power saving unit 29 for reducing power consumption of the information processing apparatus 1 in accordance with a predetermined procedure.

With reference to FIG. 3, the principle operation of the information processing apparatus 1, in particular the basic operation of how the apparatus controls power supply will be explained.

The power supply unit 25 of the information processing apparatus 1 receives power from the external power supply 22. The external power supply 22 could be, for example, a DC power supply that will provide a DC voltage which is produced when a voltage from a commercial power supply (100V, 50/60 Hz) is converted by the AC adaptor, etc. In addition, the apparatus may be configured to supply an AC voltage from the commercial power supply directly to the power supply unit 25 where the AC voltage is converted to the DC voltage.

The power supply unit 25 may be configured to include a rechargeable battery 251, e.g., lithium-ion battery or nickel-hydrogen battery. In a case where the power supply unit 25 incorporates the rechargeable battery 251, when the external power supply 22 is not connected to the apparatus, the electrical power of the battery 251 is supplied to the individual electronic components of the information processing apparatus 1. On the other hand, when the external power supply is connected to the apparatus, the electrical power of the external power supply 22 is preferentially supplied to the individual electronic components of the information processing apparatus 1. Further, when the electrical power of the battery 251 is insufficient, the battery 251 is charged by the external power supply 22.

The power supply unit 25 converts the electrical power from the external power supply 22 or the battery 251 to voltages, e.g., 5V or 3.3V adjusted to the individual electronic components of the information processing apparatus 1, and then delivers the voltages to the individual electronic components. The voltages are delivered to the individual electronic components, respectively, or via a power delivery switch 255 (refer to FIG. 5) capable of turning on and off the corresponding power supply for each of individual groups formed by dividing a plurality of electronic components into a plurality of groups.

The power supply unit 25 is controlled by the power supply control unit 26.

There are various methods for activating the information processing apparatus 1. The most general method is to allow a user to press the power supply switch 10 (refer to FIG. 1) of the information processing apparatus main body 2 to activate the information processing apparatus 1.

More specifically, the power supply control unit 26 recognizes, as an activation instruction signal, a signal from the power supply switch pressed by the user and transmits a control signal to the power supply unit 25. The power supply unit 25 receives the control signal and turns on the power delivery switch to deliver electrical power to the individual electronic components of the information processing apparatus 1.

Further, the apparatus may be, for example, configured to generate an activation instruction signal at predetermined time points or to generate an activation instruction signal in response to an instruction from outside via a telecommunication line, in order to activate the information processing apparatus 1.

When electrical power is supplied to the individual electronic components of the information processing apparatus 1, for example, the BIOS (Basic Input/Output System) is read out from a non-volatile memory called a BIOS-ROM and an OS (Operating System) stored, for example, in an HDD (Hard Disk Drive) is subsequently activated.

After activation of the OS, various application software such as document creation and spreadsheet software are activated to perform various information processing tasks.

Note that the information processing unit 21 of FIG. 3 operates as a part of the BIOS and OS or executes various application softwares for processing of information.

Upon activation of the OS, signals can be communicated between the information processing apparatus 1 and the external electronic device 17 connected to the apparatus via the interface 27.

Although the information processing apparatus 1 may include various interfaces, it includes at least the USB interface 27 that includes a single connector for allowing communication of signals and supply of electrical power, as shown in FIG. 3.

The electronic device detection unit 24 is capable of detecting that the external electronic device 17 is being connected to the apparatus via the USB interface 27 and the information processing unit 21. The information processing unit 21 and the external electronic device 17 communicate signals to each other via a serial bus of the USB, etc., and the signal communicated therebetween allows for detection of connection of the external electronic device 17.

The signals communicated via the serial buses also include information indicating the type of the external electronic device 17. The type determination unit 28 is for determining the type of the external electronic device 17 based on the information indicative of the type and classifying the device. More specifically, when the external electronic device 17 is, for example, a portable electronic device, such as a cellular phone, incorporating a rechargeable battery, the device 17 is classified into a category "A". Further, when the external electronic device 17 is, for example, an electronic device that includes non-portable electronic components, such as a mouse and a scanner, which should be used while being coupled to the information processing apparatus 1 and which are operated only by bus electrical power supplied through the USB compliant interface 27, or an electronic device that does not use bus electrical power, the device 17 is classified into a category "B".

When the electronic device 17 classified into the category "A" is connected to the USB compliant interface 27, bus electrical power is supplied via the interface 27. A battery incorporated within the electronic device 17 classified into the category "A" is charged with the bus electrical power. At least during operation of the information processing apparatus 1, the battery charge is continued. Note that in general, it is also possible to operate the electronic device 17 using the bus electrical power while charging the battery, however, whether or not it is possible to operate the device in such a manner depends on what the electronic device 17 connected to the apparatus is.

The USB compliant interface 27 is provided with a so-called hot plug function. Accordingly, even when the external electronic device 17 is connected to the interface 27 after activation of the OS, the apparatus 1 is able to detect presence/absence of connection, type and category of the electronic device 17.

The electronic device detection unit 24 and the type determination unit 28 store a flag indicative of presence/absence of connection of the electronic device 17 and the category of the electronic device 17 in an appropriate memory.

The external power supply detection unit 23 is for detecting presence/absence of connection of the external power supply 22. Detection of presence/absence of connection of the external power supply 22 is possible, for example, by comparison between a power supply voltage supplied from the external power supply 22 and a predetermined threshold value. The external power supply detection unit 23 stores in an appropriate memory a flag indicative of presence of connection of the external power supply 22 upon detection of connection of the external power supply 22.

There are various ways for a user to deactivate (turn off) the information processing apparatus 1. For example, the user often takes the step of opening a shutdown window during activation of OS and clicking on a display of "Shut Down" to cause the apparatus to be deactivated (deactivation instruction). Clicking on the display to cause the apparatus to be deactivated allows a predetermined shutdown procedure to take place, e.g., allows data needed under control by the OS to be stored in the HDD.

The deactivation instruction is transmitted to the power supply control unit 26. The power supply control unit 26 supplies a control signal to the power supply unit 25 in order to stop the supply of electrical power to the individual electronic components of the information processing apparatus 1.

In response to the control signal, the power supply unit 25 turns off a power distribution switch used to supply electrical power to the individual electronic components. The power distribution switch 255 is capable of being turned off for each of the individual electronic components or for each of groups of the electronic components.

Conventionally, irrespective of presence/absence of connection of the external electronic device 17, the supply of electrical power to nearly all of the electronic components excluding small power consumption electronic components such as a keyboard controller 80 (refer to FIG. 4) is stopped. As a result, the supply of bus electrical power from the interface 27 is also stopped.

Accordingly, there has been a problem that even in a case where the apparatus has the external electronic device 17 connected thereto and the battery charge to the device 17 has not been completed, the battery charge is interrupted during supply of electrical charge.

In contrast to it, the information processing apparatus 1 according to the invention is configured so that the electronic device detection unit 24 stores information indicative of presence/absence of connection of the external electronic device 17 in a flag. The power supply control unit 26 checks the flag after receipt of the deactivation instruction and when the external electronic device 17 is being connected to the apparatus, instructs the power supply unit 25 to keep supplying bus electrical power to the external electronic device 17 while stopping the supply of electrical power to the electronic components other than those necessary for the supply of electrical power to the external electronic device 17.

More specifically, for example, switches on the power distribution switch 255 are controlled so that the supply of electrical power to the USB controller 70 (refer to FIG. 4) constituting the interface 27 is continued while the supply of electrical power to the electronic components other than the USB controller 70 is stopped.

In a case where the external electronic device 17 is being connected to the apparatus, such a power supply control procedure in the information processing apparatus 1 allows the apparatus to keep supplying bus electrical power to the electronic device 17 even when the information processing apparatus 1 is deactivated and prevents the problem of having the battery charge stopped during supply of electrical charge to the battery of the external electronic device 17.

The electronic device 17 to be connected to the information processing apparatus 1 also includes the electronic device classified into the category "B". The electronic device 17 classified into the category "B" is a mouse or scanner that does not need to be electrically charged and never be adversely affected even when bus electrical power being supplied to the device 17 is stopped immediately when the information processing apparatus 1 is deactivated.

When all of the electronic devices 17 being connected to the information processing apparatus 1 are classified into the category "B", no benefit results from keeping supplying bus electrical power through the interface 27 even after deactivation of the information processing apparatus 1. Keeping supplying bus electrical power through the interface 27 even after deactivation of the information processing apparatus 1 means that unnecessary electrical power is supplied to the USB controller 70 used in the interface 27, causing an adverse effect on the apparatus.

To prevent such unnecessary electrical power consumption, the type of the electronic device 17 being connected to the apparatus is determined by the type determination unit 28 and even when the electronic devices 17 are being connected to the apparatus and further when all of the electronic devices 17 belong to the category "B", it is preferred that the supply of electrical power to the USB controller 70 is stopped immediately when the information processing apparatus 1 is deactivated, in order to stop supply of bus electrical power.

Consequently, unnecessary electrical power is not dissipated and electrical power of the information processing apparatus 1 can be saved.

Further, in the embodiment, keeping supplying bus electrical power even after deactivation of the information processing apparatus 1 requires information indicative of connection of the external power supply 22 in addition to information indicative of presence/absence of connection of the electronic device 17.

As a result, even when the information processing apparatus 1 is being operated only by the battery 251 incorporated within the apparatus, problematic situation in which continued supply of bus electrical power to the external electronic device 17 even after deactivation of the information processing apparatus potentially causes the drainage or over-discharge of the battery 251 can be avoided.

Note that presence/absence of connection of the external power supply 22 is detected by the external power supply detection unit 23.

Further, the apparatus may be configured so that when the absence of connection of the external power supply 22 is detected by the external power supply detection unit 23, the supply of bus electrical power to the external electronic device 17 is stopped even during operation of the information processing apparatus 1. Stopping of the supply of bus electrical power contributes to reduction of electrical power consumed by the battery 251.

Note that many of nowadays information processing apparatuses, particularly portable information processing devices such as a note personal computer, are provided with a power saving function such as a "suspend" or "hibernation" function. The power saving function such as a "suspend" or "hibernation" function is very useful in terms of reduction of electrical power consumed by the information processing apparatus 1. However, in a case where the external electronic device 17 such as a cellular phone is connected to the information processing apparatus 1 in order to charge the battery of the device, when such a power saving function is automatically activated before the battery is fully charged, the power supply of the information processing apparatus 1 is turned off accordingly and at that instant, the battery charge is stopped, causing inconvenience to a user.

Further, it is also possible to disable the "suspend" or "hibernation" function to preferentially charge the battery of the external device. However, in such a case, after the battery is fully charged, a user has to operate to enable again those power saving functions in a time-consuming manner.

Accordingly, in a case where the information processing apparatus 1 has provided therein power saving unit 29 for implementing those power saving functions, the apparatus is configured so that a power supply control instruction to be outputted to the power supply control unit 26 from the power saving unit 29 for power saving is issued in the same manner as the instruction to deactivate the apparatus.

Consequently, even if supply of electrical power to substantially all of the electronic components of the information processing apparatus 1 is stopped when the power saving function such as "suspend" or "hibernation" function is activated, the supply of bus electrical power via the interface 27 can be maintained to keep supplying electrical charge to the battery of the electronic device 17 such as a cellular phone even during a power saving mode.

(2) Detailed Configuration of Information Processing Apparatus 1

Figure 4:
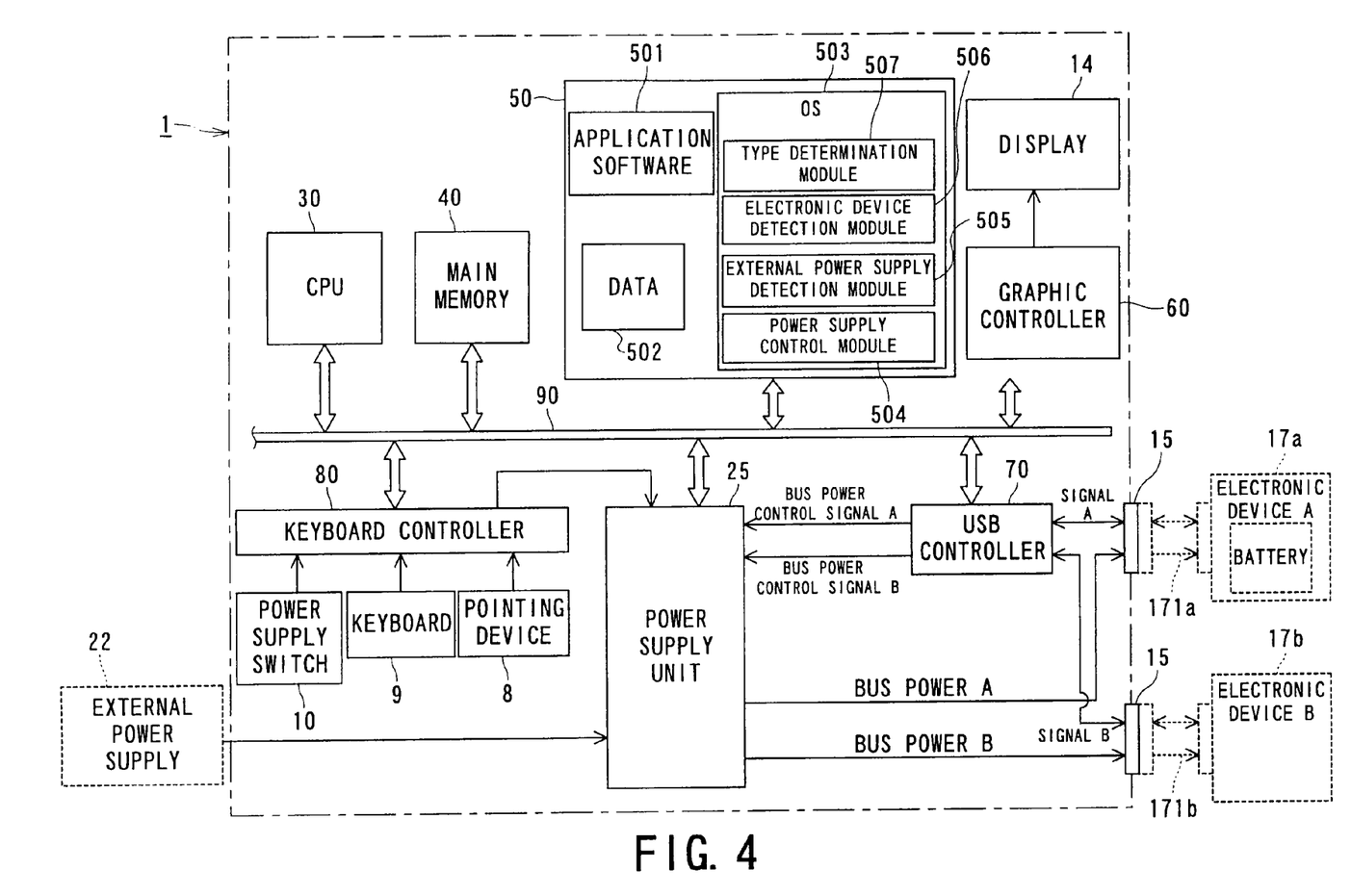
FIG. 4 is a system configuration diagram of one embodiment of an information processing apparatus according to the invention.

FIG. 4 is the exemplary configuration of the information processing apparatus 1, showing main electric components (hardware) provided in the apparatus. The individual functional unit shown in FIG. 3 can be implemented by causing a CPU to execute predetermined software.

As shown in FIG. 4, the information processing apparatus 1 includes a CPU 30 for executing various software, a main memory 40 for temporarily storing software executed by the CPU 30 and data, an HDD 50 for storing software and data in a non-volatile storage medium, and a graphic controller 60 for controlling display of various information and images to be displayed on a display 14, in which all of these individual electronic components are connected to an internal bus 90.

Also, the information processing apparatus 1 further includes a USB controller 70 for effecting conversion between data on the internal bus and serial USB signals while generating a bus electrical power control signal, and a power supply unit 25 for supplying electrical power to the USB controller 70 and the other electronic components while supplying bus electrical power via the USB connector 15. Both the USB controller 70 and the power supply unit 25 are connected to the internal bus 90.

In addition to the above electronic components, the apparatus includes a keyboard controller 80 for converting signals from a power supply switch 10, keyboard 9 and pointing device 8, and coupling the signals to the internal bus 90.

To the information processing apparatus 1 is coupled an electronic device A17a and an electronic device B17b via the USB connectors 15. The electronic device A17a is an electronic device classified into the category "A", for example, a portable electronic device such as a cellular phone and incorporates a rechargeable battery. On the other hand, the electronic device B17b is an electronic device classified into the category "B", for example, a mouse that does not incorporate a battery.

Although the embodiment of the information processing apparatus 1 of FIG. 4 is shown as having two USB connectors 15, the number of the USB connectors 15 is not limited to two, but may be one or not less than three. Further, instead of employing the USB interfaces (USB controller 70 and USB connectors 15), the apparatus could employ IEEE 1394 interfaces (IEEE 1394 controller and IEEE 1394 connectors: not shown). Moreover, the apparatus may include both the USB interfaces and IEEE 1394 interfaces. Alternatively, the apparatus could employ Power over Ethernet products certified compliant with IEEE 802.3af standard.

Further, one possible embodiment of the invention is to allow the interface provided in the information processing apparatus 1 to transmit signals and bus electrical power through a single connector.

Figure 5:
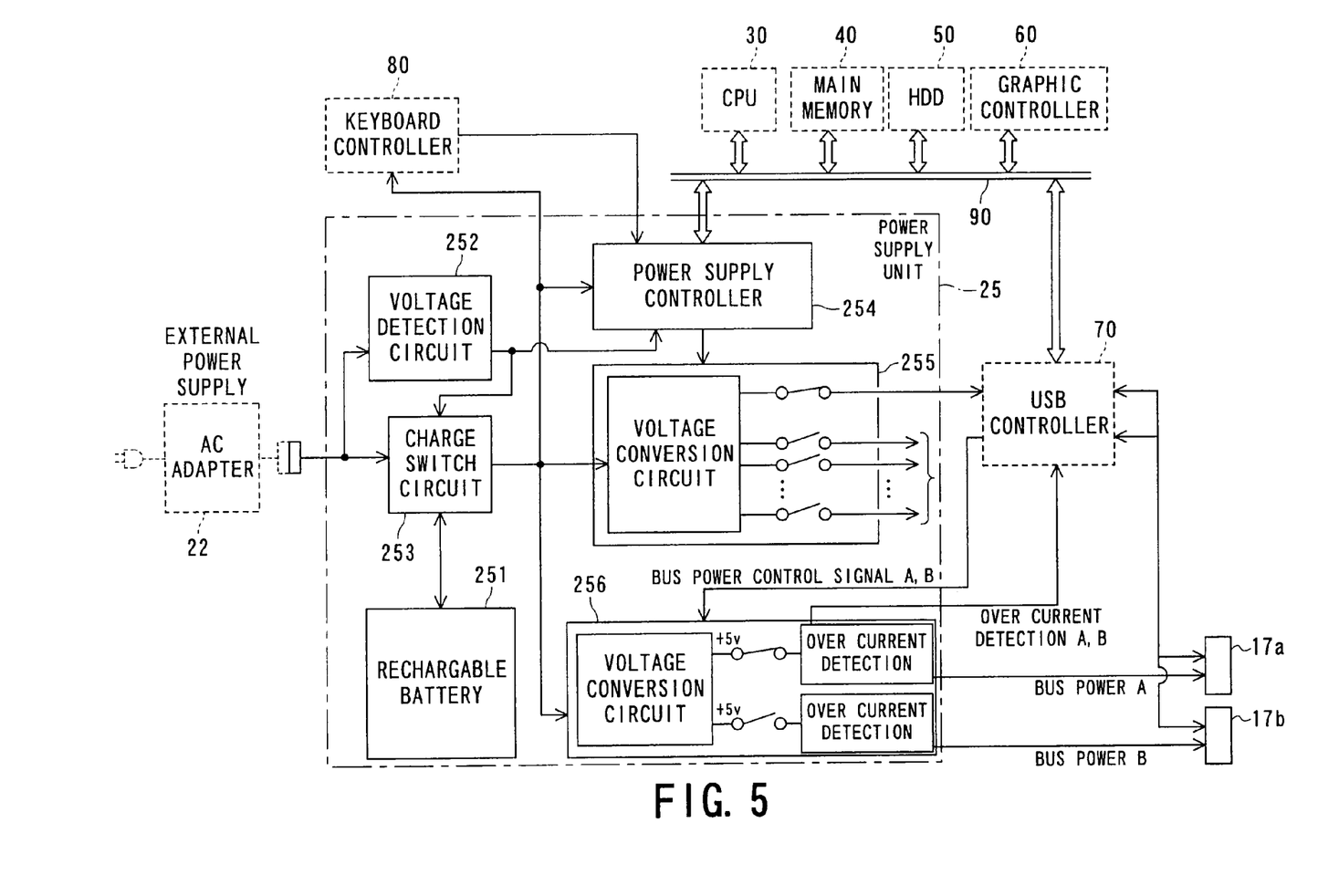
FIG. 5 is a detailed configuration diagram of a power supply unit according to one embodiment of an information processing apparatus of the invention.

FIG. 5 is a diagram illustrating the detailed configuration of the power supply unit 25.

The power supply unit 25 includes a rechargeable battery 251. Additionally, the power supply unit 25 includes a voltage detection circuit 252 for detecting presence/absence of connection of an external power supply and a charge switch circuit 253 for switching a connection from the external power supply 22 to the battery 251 and vice versa in response to information indicative of presence/absence of connection of the external power supply 22 and allowing the external power supply 22 to charge the battery 251 with electrical power.

The power supply unit 25 further includes a power supply controller 254. The power supply controller 254 is connected to the internal bus 90 and operable to receive a power supply control signal for control of the power supply unit 25 and to output power supply information indicative of presence/absence of connection of the external power supply 22 to the internal bus 90.

Moreover, the power supply unit 25 further includes a power distribution switch 255 for switching between supply and cutoff of the supply of electrical power to the USB controller 70 and the remaining electronic components in response to the control signal from the power supply controller 254, and a bus electrical power switch 256 for switching between supply and cutoff of the supply of bus electrical power through USB interfaces in response to the control signal from the USB controller 70.

(3) Detailed Description of how Information Processing Apparatus 1 Controls Power Supply.

With reference to FIGS. 4 and 5, how the information processing apparatus 1 controls power supply will be explained below.

In a case where the external power supply 22 is being connected to the information processing apparatus 1, electrical power from the external power supply 22 is supplied through the charge switch circuit 253 of the power supply unit 25 to charge the battery 251, as shown in FIG. 5. In this case, if the overcharging prevention function, etc., provided in the charge switch circuit 253 is activated automatically when the battery 251 is fully charged, no charging is applied to the battery 251.

The presence/absence of connection of the external power supply 22 is determined by, for example, whether or not a voltage detected by the voltage detection circuit 252 is beyond a predetermined threshold value. When the presence of connection of the external power supply 22 is detected, the charge switch circuit 253 switches a connection from the battery 251 to the external power supply 22 in order to preferentially output the electrical power from the external power supply 22.

On the other hand, in a case where the external power supply 22 is not connected to the apparatus, the electrical power from the battery 251 is output through the charge switch circuit 253.

The electrical power output from the charge switch circuit 253 is supplied to the power distribution switch 255, bus electrical power switch 256, power supply controller 254, and keyboard controller 80 of the power supply unit 25, irrespective of whether the information processing apparatus 1 is in operation or out of operation.

While the information processing apparatus 1 is out of operation (the power supply is turned off), a user presses the power supply switch 10 and then a signal generated by pressing of the switch is transmitted via the keyboard controller 80 to the power supply controller 254 of the power supply unit 25.

The power supply controller 254 recognizes the signal generated by pressing of the power supply switch 10 as an instruction signal for activating the information processing apparatus 1 and instructs the power distribution switch 255 to make proper connections so that all of the switches are closed to supply electrical power to the individual electronic components of the information processing apparatus 1.

When the electrical power is supplied to the individual electronic components of the information processing apparatus 1, first, BIOS stored, for example, in the non-volatile memory (not shown) is activated and then OS 503 stored in the HDD 50 is activated.

Upon the activation of the OS 503, for example, an appropriate instruction from a user allows various kinds of application software 501 to be activated.

The OS 503 includes software modules for control of power supply, such as a power supply control module 504, external power supply detection module 505, electronic device detection module 506, and type determination module 507.

The power supply control module 504 is operable to control supply of electrical power to the individual electronic components of the information processing apparatus 1 and supply of bus electrical power through the USB connector 15.

The external power supply detection module 505 is operable to monitor presence/absence of connection of the external power supply 22 based on information from the voltage detection circuit 252 of the power supply unit 25 and store in an appropriate memory a flag indicative of the presence/absence of connection of the external power supply 22 when the external power supply 25 is provided, external to the apparatus, for making connection to the apparatus.

The electronic device detection module 506 is operable to monitor presence/absence of connection of the external electronic device 17 based on information from the USB controller 70 and store in an appropriate memory a flag indicative of the presence/absence of connection of the external electronic device when the electronic device 17 is provided, external to the apparatus, for making connection to the apparatus.

Further, the type determination module 507 is operable to determine the type of the electronic device 17 connected to the apparatus based on information from the USB controller 70 and identify whether the electronic device 17 is the electronic device 17a belonging to the category "A" or the electronic device 17b belonging to the category "B", and then, store a flag indicative of the category or type in an appropriate memory.

During operation of the information processing apparatus 1, electrical power is also being supplied to the USB controller 70. The USB controller 70 performs conversion between a signal on the internal bus 90 and a USB signal (i.e., communication signal between the external electronic device 17 connected via the USB connector 15 and the apparatus 1). Further, the USB controller controls the supply and cutoff of bus electrical power supplied to the external electronic device 17 from the USB connector 15.

For example, the USB controller 70 controls the supply of bus electrical power so that all bus electrical power in an initial operational state is supplied to the corresponding electronic components. This control is performed by transmitting a control signal (bus electrical power control signals A, B) from the USB controller 70 to the bus electrical power switch 256 of the power supply unit 25 (refer to FIG. 5). The bus electrical power switch 256 is operable to convert electrical power from the external power supply 22 or the battery 251 to a predetermined voltage, e.g., 5 volts, and then supply as bus electrical powers A, B the voltages via the switches that are turned on/off in response to the bus electrical power control signals A, B to the individual USB connectors 15. In the initial operational state (i.e., the state resulting from activation of the information processing apparatus 1 that has been out of operation), bus electrical power is supplied to both the external electronic devices A17a and B17b.

During operation of the information processing apparatus 1, the individual software modules, placed in the OS, such as the power supply control module 504, external power supply detection module 505, electronic device detection module 506, and type determination module 507 are always operating (or operate at certain time intervals).

Accordingly, even in a case where the external power supply 22 is disconnected from the apparatus, or the type of the electronic device A17a or B17b is altered or the electronic device A17a or B17b is disconnected from the apparatus during operation of the information processing apparatus 1, the apparatus is able to detect a change in the operational state of the apparatus. Consequently, a flag indicative of presence/absence of connection of the external power supply 22, presence/absence of connection of the external electronic device 17, or the type of the electronic device 17 is always updated to reflect the latest state of the apparatus by operation of the external power supply detection module 505, electronic device detection module 506, and type determination module 507.

During operation of the information processing apparatus 1, the power supply control module 504 typically performs control so that bus electrical power is supplied via the USB connector 15.

Note that in a case where the external power supply is not connected to the apparatus, the embodiment of the apparatus may be configured to perform control so that the supply of bus electrical power is stopped even during operation of the information processing apparatus 1. This is because there sometimes is a need to give the information processing within the information processing apparatus 1 priority over the supply of bus electrical power to the external electronic device 17, depending on the power capacity of the battery provided in the information processing apparatus 1.

If the information processing apparatus 1 is deactivated or a deactivation instruction is issued to the apparatus when the suspend function, etc., is activated, the power supply control module 504 placed in the OS 503 checks a flag indicative of presence/absence of connection of the external power supply 22, presence/absence of connection of the external electronic device 17, or the type of the electronic device 17.

When the fact that the external power supply 22 is being connected to the apparatus and the electronic device 17 external to the apparatus is being connected to the apparatus is found as a result of checking of the flag, the power supply control module 504 instructs the power supply controller 254 of the power supply unit 25 to keep supplying electrical power to the USB controller 70 even in the event the information processing apparatus 1 is deactivated. Simultaneously, the power supply controller 254 instructs the USB controller 70 to keep supplying bus electrical power even in the event the information processing apparatus 1 is deactivated.

Upon receipt of the instruction to keep supplying bus electrical power, the USB controller 70 sets bus electrical power control signals A, B so that the bus electrical power switch 256 continues to be turned on even after deactivation of the information processing apparatus 1. In this case, the apparatus may perform control so that the USB controller 70 checks the type of the electronic device 17 connected to the apparatus and when the electronic device 17 belongs to the category "A", instructs the bus electrical power switch 256 to keep supplying electrical power to the corresponding electronic device 17a, and when the electronic device 17 belongs to the category "B", instructs the switch 256 to stop supplying electrical power to the corresponding electronic device 17b.

It should be noted that when the deactivation instruction is issued in response to deactivation of the apparatus (turning off of the power supply of the information processing apparatus 1), the power supply control module 504 may stop supply of electrical power to the electronic components other than the USB controller 70, as shown in the switching diagram of the power distribution switch 255 in FIG. 5.

By contrast, if the deactivation instruction is issued when the power saving function such as suspend function is activated, the power supply control module 504 may keep supplying electrical power to the predetermined electronic components, e.g., the main memory 40, in addition to the USB controller 70 and stop supply of electrical power to the electronic components other than those predetermined electronic components.

Figure 6:
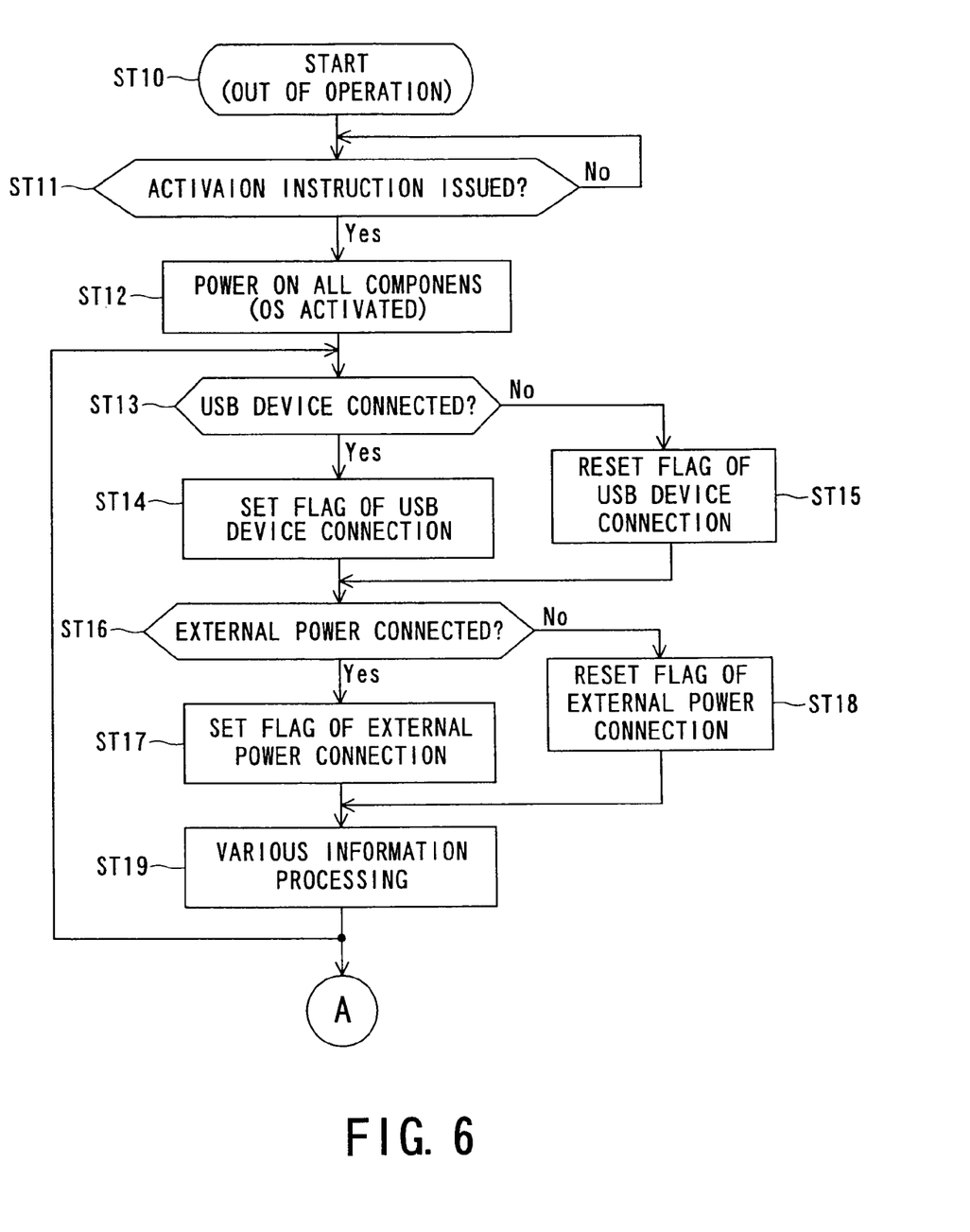
FIG. 6 is the first flow chart for a power supply control process in one embodiment of an information processing apparatus according to the invention.
Figure 7:
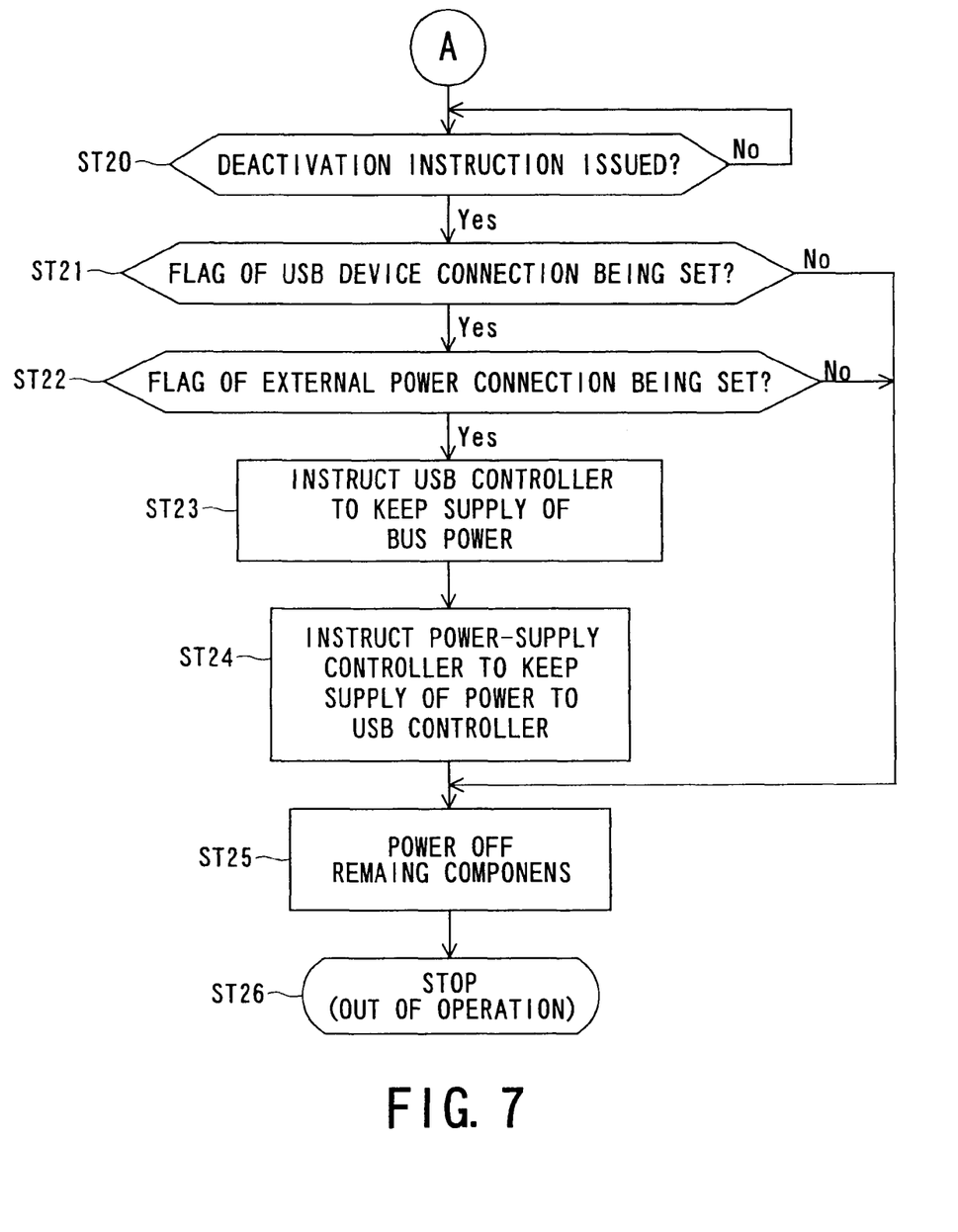
FIG. 7 is the second flow chart for a power supply control process in one embodiment of an information processing apparatus according to the invention.

FIGS. 6 and 7 are a flow chart showing how the information processing apparatus 1 controls the power supply.

FIG. 6 is a flow chart showing a process ranging from the out-of-operation (step ST10) of the information processing apparatus 1 to the in-operation thereof. Further, FIG. 7 is a flow chart showing a process ranging from the in-operation of the apparatus to the out-of-operation thereof (step ST26) upon receipt of deactivation instruction by the apparatus.

In step ST11 of FIG. 6, the information processing apparatus 1 monitors presence/absence of activation instruction. In the information processing apparatus 1, even during the out-of-operation period, electrical power is continually supplied to the keyboard controller 80, power supply controller 254, etc., and thus those electronic components are operating. When a user presses, for example, the power supply switch 10, the apparatus recognizes the signal from the switch as an activation instruction.

In step ST12, the power supply unit 25 turns on power supply switches corresponding to the individual electronic components. Afterwards, the OS 503 is activated. After activation of the OS 503, the information processing apparatus 1 operates in operation mode.

During operation of the information processing apparatus 1, the electronic device detection module 506 placed in the OS 503 is monitoring presence/absence of connection of the external electronic device 17 (step ST13). In this case, the apparatus may be configured so that the type determination module 507 placed in the OS 503 monitors the type of the external electronic device 17 as well and determines whether the electronic device connected to the apparatus is a predefined electronic device belonging to the category "A" or an electronic device belonging to the category "B", i.e., an electronic device other than the predefined electronic device.

When the predefined electronic device 17 is being connected to the apparatus, an appropriate flag indicating "presence of connection of USB device" is stored in an appropriate memory (step ST14). By contrast, the predefined electronic device 17 is not connected to the apparatus, the flag indicating "presence of connection of USB device" is reset (step ST15).

Further, the external power supply detection module 505 placed in the OS 503 monitors whether or not the external power supply 22 is being connected to the apparatus (step ST16). When the external power supply 22 is being connected to the apparatus, an appropriate flag indicating "presence of connection of external power supply" is stored in an appropriate memory (step ST17). By contrast, the external power supply 22 is not connected to the apparatus, the flag indicating "presence of connection of external power supply" is reset (step ST18).

Afterwards, the information processing apparatus 1 performs various information processing tasks (step ST19). Note that the process ranging from step ST13 to step ST18 may be performed by temporarily interrupting the execution of the various information processing tasks (step ST19).

During operation of the information processing apparatus 1, presence/absence of deactivation instruction is being monitored (step ST20 of FIG. 7).

In response to detection of the presence of deactivation instruction (yes at step ST 20), the power supply control module 504 placed in the OS 503 checks the flag indicating "presence of connection of USB device". When the flag indicating "presence of connection of USB device" is being set up, the power supply control module 504 further checks the flag indicating "presence of connection of external power supply".

When the flag indicating "presence of connection of external power supply" is being set up (yes at step ST 22), i.e., both the flag indicating "presence of connection of USB device" and the flag indicating "presence of connection of external power supply" are being set up, the apparatus instructs the USB controller 70 to "keep supply" of bus electrical power to the predetermined USB device (electronic device 17a) (step ST23). Further, the apparatus instructs the power supply controller 254 of the power supply unit 25 to "keep supply" of electrical power to the USB controller 70 (step ST24).

Afterwards, the supply of electrical power to the electronic components corresponding to the instruction to "keep supply" of electrical power and the supply of bus electrical power to the electronic components corresponding to the instruction to "keep supply" of bus electrical power are maintained and supply of electrical power to the remaining electronic components is stopped, thereby causing the apparatus to be out of operation (steps ST25 and ST26).

It should be appreciated that when any one of the flag indicating "presence of connection of USB device" and the flag indicating "presence of connection of external power supply" is not being set up (no at step ST 21 and no at step ST 22), no electronic component is instructed to "keep supply" of electrical power and thus all supplies of bus electrical power are stopped and the supply of electrical power to the USB controller 70 is also stopped, thereby causing the apparatus to be out of operation (step ST26).

It should be understood that the invention is not limited solely to the above embodiments, but it is apparent that in practice, various modifications can be made to the components without departing the spirit and scope of the invention. Further, the use of an appropriate combination of a plurality of the components disclosed in the above embodiments would permit a skilled person to develop various inventions. For example, some components may be excluded from all of the components described in the embodiments. Further, the components used in the different embodiments may be appropriately combined.

For example, in the above embodiments, in order to keep supplying bus electrical power to the external electronic device 17 in the event the information processing apparatus 1 is deactivated, two conditions have to be confirmed, i.e., presence/absence of connection of the electronic device 17 and presence/absence of connection of the external power supply 22 have to be checked.

By contrast, rather than determining only the presence/absence of connection of the external power supply 22, another embodiment involves determining the state of a power supply group consisting of the power supply unit 25 and the external power supply 22, i.e., determining the state of the power supply unit 25 and the presence/absence of connection of the external power supply 22. In this case, in order to keep supplying bus electrical power to the external electronic device 17, the presence/absence of connection of the electronic device 17 and the state of the power supply unit 25 have to be determined.

The state of the power supply unit 25 includes the presence/absence of connection of external power supply 22 as well as the remaining capacity of the battery 251 provided in the power supply unit 25. For example, the apparatus may be configured so that the charge switch circuit 253 detects the remaining capacity of the battery 251 and when the remaining capacity is not less than a predetermined threshold value, for example, 70% of rated capacity, the apparatus keeps supplying bus electrical power even in a case where the external power supply 22 is not connected to the apparatus and when the remaining capacity is less than 70% of rated capacity, the apparatus stops supply of bus electrical power unless the external power supply 22 is being connected to the apparatus. In such an embodiment of the apparatus, whether the supply of bus electrical power is to be maintained can be determined based on the overall state of the power supply unit 25 that includes the external power supply 22 and battery 251 and therefore an opportunity for the apparatus to be able to charge the battery of the external electronic device 17 increases, allowing the apparatus to provide even greater convenience to a user.

What is claimed is:

1. An information processing apparatus comprising:
   an information processing unit configured to process various information;
   an interface capable of supplying electrical power to and communicating a signal with an electronic device external to the apparatus through a single connector;
   a power supply unit configured to be capable of supplying electrical power to the electronic device through the interface and including a rechargeable battery;
   an electronic device detection unit configured to detect connection of the electronic device to the apparatus;
   an external power supply detection unit configured to detect an external power supply to the apparatus, the external power supply operable to supply electrical power to the power supply unit;
   a power supply control unit, when the connection of the electronic device to the apparatus is detected by the electronic device detection unit and the connection of the external power supply for charging the rechargeable battery to the apparatus is detected by the external power supply detection unit, configured to keep supplying electrical power to the electronic device through the interface even after deactivation of the apparatus, in the event an instruction to turn off a power supply of the apparatus or deactivate the apparatus is issued; and
   a type determination unit configured to determine a type of the electronic device connected to the apparatus, wherein,
   when the connection of the external power supply for charging the rechargeable battery to the apparatus is not detected, the power supply control unit does not supply the electrical power to the electronic device through the interface even during operation of the apparatus, and
   in the event the type determined by the type determination unit is a predetermined type, the power supply control unit keeps supplying electrical power to the electronic device of the predetermined type even after deactivation of the apparatus and wherein in the event the determined type is different from the predetermined type, the power supply control unit stops supply of electrical power to an electronic device whose type is different from the predetermined type after deactivation of the apparatus.

2. The information processing apparatus according to claim 1, further comprising:
   a predetermined power saving unit, wherein
   the power supply control unit keeps supplying electrical power to the electronic device even after the apparatus is deactivated by the power saving unit.

3. The information processing apparatus according to claim 1, wherein the electronic device of the predetermined type is a portable electronic device incorporating a rechargeable battery.

4. The information processing apparatus according to claim 1, wherein the interface is any one of a USB (Universal Serial Bus) compliant interface, IEEE-1394 compliant interface, and IEEE802.3af-compliant Power over the Ethernet interface.

5. The information processing apparatus according to claim 1, wherein, when the connection of the external power supply for charging the rechargeable battery to the apparatus is not detected, and the remaining capacity of the rechargeable battery of the power supply unit is less than a predetermined threshold value, the electrical power is not supplied to the electronic device through the interface even during operation of the information processing apparatus.

6. The information processing apparatus according to claim 5, wherein the predetermined threshold value is 70% of the rated capacity of the rechargeable battery.

7. A method for controlling a power supply of an information processing apparatus that includes an interface capable of supplying electrical power to and communicating a signal with an electronic device external to the apparatus through a single connector and a power supply unit having a rechargeable battery and being capable of receiving electrical power from an external power supply, the method comprising:
   supplying electrical power to the electronic device from the power supply unit through the interface during operation of the information processing apparatus; keeping supplying electrical power to the electronic device through the interface even after deactivation of the information processing apparatus, in the event the electronic device and the external power supply are being connected to the information processing apparatus;
   determining a type of the electronic device connected to the apparatus;
   keeping supply electrical power to the electronic device of a predetermined type even after deactivation of the apparatus in the event the type of the electronic device is the predetermined type; and stopping supply of electrical power to the electronic device whose type is different from the predetermined type after deactivation of the apparatus, wherein when the external power supply for charging the rechargeable battery is not connected to the apparatus, the electrical power is not supplied to the electronic device through the interface even during operation of the information processing apparatus.

8. The method for controlling a power supply of an information processing apparatus according to claim 7, wherein, the information processing apparatus further includes a predetermined power saving unit, and the supply of electrical power to the electronic device is continued even after the apparatus is deactivated by the power saving unit.

9. The method for controlling a power supply of an information processing apparatus according to claim 7, wherein the electronic device of the predetermined type is a portable electronic device incorporating a rechargeable battery.

10. The method for controlling a power supply of an information processing apparatus according to claim 7, wherein the interface is any one of a USB (Universal Serial Bus) compliant interface, IEEE-1394 compliant interface, IEEE802.3af-compliant Power over the Ethernet interface.

11. The method for controlling a power supply of an information processing apparatus according to claim 7, wherein, when the external power supply for charging the rechargeable battery is not connected to the apparatus and the remaining capacity of the rechargeable battery of the power supply unit is less than a predetermined threshold value, the electrical power is not supplied to the electronic device through the interface even during operation of the information processing apparatus.

12. The method for controlling a power supply of an information processing apparatus according to claim 11, wherein the predetermined threshold value is 70% of the rated capacity of the rechargeable battery.

13. A method for controlling of an information processing apparatus that includes an interface capable of supplying electrical power to and communicating a signal with an electronic device external to the apparatus through a single connector and a power supply unit having a rechargeable battery and being capable of receiving electrical power from an external power supply, the method comprising:

supplying electrical power to the electronic device from the power supply unit through the interface when the electronic device is being connected to the connector during operation of the information processing apparatus;

detecting the state of the power supply unit when operation of the information processing apparatus is terminated or interrupted; and keeping supplying electrical power to the electronic device through the interface even after deactivation of the information processing apparatus when one of the two facts that the power supply unit is receiving electrical power from the external power supply and that the remaining capacity of the rechargeable battery of the power supply unit is not less than 70% of the rated capacity of the rechargeable battery is detected, wherein when the external power supply for charging the rechargeable battery is not connected to the apparatus, the electrical power is not supplied to the electronic device through the interface even during operation of the information processing apparatus.

* * * * *